US007858018B2

(12) United States Patent
Shver

(10) Patent No.: US 7,858,018 B2
(45) Date of Patent: *Dec. 28, 2010

(54) MOUNTING ENCLOSURE FOR BURNERS AND PARTICLE INJECTORS ON AN ELECTRIC ARC FURNACE

(75) Inventor: Valery Shver, Alpharetta, GA (US)

(73) Assignee: Process Technology International, Inc., Tucker, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/372,641

(22) Filed: Feb. 17, 2009

(65) Prior Publication Data

US 2009/0151510 A1    Jun. 18, 2009

Related U.S. Application Data

(63) Continuation of application No. 10/903,123, filed on Jul. 31, 2004, now Pat. No. 7,491,360, which is a continuation of application No. 10/011,557, filed on Oct. 30, 2001, now Pat. No. 6,805,724, which is a continuation-in-part of application No. 09/902,139, filed on Jul. 10, 2001, now Pat. No. 6,614,831, and a continuation-in-part of application No. 09/875,153, filed on Jun. 5, 2001, now Pat. No. 6,749,661, said application No. 09/902,139 is a continuation-in-part of application No. 09/502,064, filed on Feb. 10, 2000, now Pat. No. 6,289,035, said application No. 09/875, 153 is a continuation-in-part of application No. 09/502,064, filed on Feb. 10, 2000, now Pat. No. 6,289, 035.

(51) Int. Cl.
    *C22B 4/00*      (2006.01)

(52) U.S. Cl. .......................................... 266/47; 373/72

(58) Field of Classification Search .................. 266/47, 266/189; 373/66, 72
See application file for complete search history.

(56) References Cited

U.S. PATENT DOCUMENTS

| 3,459,867 | A | | 8/1969 | Estes |
| 3,899,628 | A | * | 8/1975 | Hirt ............................. 373/2 |
| 3,902,889 | A | | 9/1975 | Malin |
| 4,077,614 | A | * | 3/1978 | Udo et al. .................. 266/159 |

(Continued)

FOREIGN PATENT DOCUMENTS

GB      2280501      2/1995

*Primary Examiner*—Scott Kastler
(74) *Attorney, Agent, or Firm*—Troutman Sanders LLP; James E. Schutz; Robert R. Elliott, Jr.

(57) ABSTRACT

An enclosure for mounting burners and particle injection equipment in an electric arc furnace (EAF) is described. The enclosures are mounted on the sidewalls of an EAF and include passages in which burners or injectors are mounted so that the discharge ends of the burners and injectors are located closer the melt than sidewall mounted burners and injectors. Burners and injectors mounted in the enclosures heat material in the furnace and deliver particulates to the melt more efficiently than conventionally mounted burners and injectors. The enclosures are liquid-cooled, typically by water, and constructed of high conductivity materials such as copper and/or cast iron and can be constructed in one or more pieces. Therefore, the enclosures protect the burners and injectors from the excessive heat and mechanical impact to which they would normally be subjected when mounted so close to the melt.

14 Claims, 8 Drawing Sheets

U.S. PATENT DOCUMENTS

| | | |
|---|---|---|
| 4,168,968 A | 9/1979 | Udo et al. |
| 4,389,043 A | 6/1983 | Weber et al. |
| 4,701,216 A | 10/1987 | Spenceley et al. |
| 4,730,336 A | 3/1988 | Herneisen et al. |
| 4,746,103 A | 5/1988 | Takashiba et al. |
| 5,166,950 A | 11/1992 | Jouvaud et al. |
| 5,373,530 A | 12/1994 | Perrin |
| 5,444,733 A | 8/1995 | Coassin et al. |
| 5,471,495 A | 11/1995 | Berger et al. |
| 5,630,713 A | 5/1997 | Shver et al. |
| 5,954,855 A | 9/1999 | Gitman et al. |
| 6,289,035 B1 * | 9/2001 | Shver ................ 373/66 |
| 6,614,831 B2 * | 9/2003 | Shver ................ 373/66 |
| 6,749,661 B2 | 6/2004 | Shver |
| 6,805,724 B2 | 10/2004 | Shver |
| 7,491,360 B2 * | 2/2009 | Shver ................ 266/241 |
| 2004/0213318 A1 | 10/2004 | Strelbisky |

* cited by examiner

MOUNTING ENCLOSURE FOR BURNERS AND PARTICLE INJECTORS ON AN ELECTRIC ARC FURNACE

CROSS REFERENCE TO RELATED APPLICATIONS

This application is a continuation of application Ser. No. 10/903,123 filed Jul. 31, 2004, now U.S. Pat. No. 7,491,360 which is continuation of application Ser. No. 10/011,557 filed Oct. 30, 2001, now U.S. Pat. No. 6,805,724 which is a continuation-in-part of application Ser. No. 09/875,153 filed Jun. 5, 2001, now U.S. Pat. No. 6,749,661, which is a continuation-in-part of application Ser. No. 09/502,064 filed Feb. 10, 2000, now U.S. Pat. No. 6,289,035, and a continuation-in-part of application Ser. No. 09/902,139 filed Jul. 10, 2001, now U.S. Pat. No. 6,614,831, which is a continuation-in-part of application Ser. No. 09/502,064 filed Feb. 10, 2000, now U.S. Pat. No. 6,289,035. The disclosures of application Ser. Nos. 10/903,123; 09/875,153; 09/902,139 and 09/502,064 are hereby incorporated by reference herein.

BACKGROUND OF THE INVENTION

The present invention generally relates to a method and apparatus used in metal melting, refining and processing, for example, steel making in an electric arc furnace (EAF), and more particularly, to a method and apparatus for the introduction of chemical energy and particulates, for example, carbon particles entrained in a carrier gas, in an EAF.

Electric arc furnaces (EAFs) make steel by using an electric arc to melt one or more charges of scrap metal which is placed within the furnace. Modern EAFs may also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the arc.

If the EAF is used a scrap melter, the scrap burden is charged by dumping it into the furnace through the roof opening from buckets which also may include charged carbon and slag forming materials. A similar charging method using a ladle for the hot metal from a blast furnace may be used along with injection of the DRI by a lance to produce the burden.

In the melting phase, the electric arc and burners melt the burden into a molten pool of metal, termed an iron carbon melt, which accumulates at the bottom or hearth of the furnace. Typically, after a flat bath has been formed by melting of all the burden introduced, the electric arc furnace enters a refining and/or decarburization phase. In this phase, the metal continues to be heated by the arc until the slag forming materials combine with impurities in the iron carbon melt and rise to the surface as slag. During the heating of iron carbon melt it reaches the temperature and conditions when carbon in the melt combines with oxygen present in the bath to form carbon monoxide bubbles which is commonly termed as "carbon boil." Generally, flows of oxygen are blown into the bath with either lances or burner/lances to produce a decarburization of the bath by the oxidation of the carbon contained in the bath.

The resulting decarburization reduces the carbon content of the bath to a selected level. If an iron carbon melt is under 2% carbon it becomes steel. Except for operations using the hot metal from the Blast furnaces, the EAF steel making processes typically begin with burdens having less than 1% carbon. The carbon in the steel bath is continually reduced until it reaches the content desired for producing a specific grade of steel, down to less than 0.1% for low carbon steels.

With the imperative to decrease steel production times in electric arc furnaces, it becomes necessary to deliver effective decarburizing oxygen to the iron carbon melt as early in the steel making process as possible. Conventional burners mounted on the water cooled side walls of the furnace generally must wait until the melting phase of the process is substantially complete before starting high velocity injection of oxygen for the decarburization process. These burners can not deliver effective high velocity oxygen to the bath early in to the melting cycle because unmelted scrap is in the way of the injection path and would deflect the oxygen flow. The bottom of the electric arc furnace is spherical shaped and the melted scrap forms the melt in the middle of the furnace first and then it rises filling up the sides.

Therefore, it would be highly advantageous to reduce the melting phase of an electric arc furnace so that high velocity oxygen and carbon could be injected sooner and decarburize the melt faster.

One way to shorten the melting phase is to add substantially more energy with the burners at early times in the melting phase to melt the scrap faster. There are, however, practical considerations with conventional side wall mounted burners that limit the amount of energy which can be introduced into the furnace and the rate at which it can be used efficiently. The location of a conventional burners is subject to flashback. When scrap is initially loaded into the furnace, because it is located very near the flame face and oxygen jet of the burner, the danger of a flash back of the flame against the side wall where the burner is mounted is significant. The panels where the burners are mounted are typically water cooled and a burn through of a water carrying element in an electric arc furnace is a safety concern, as well as a production loss. To alleviate this concern, many fixed burners are run at less than rated capacity until the scrap is melted some distance away from the face of the burner. Only after the burner face has been cleared does the burner operate to deliver its maximum energy.

Another problem to increasing the energy added during the early part of the melting phase is that the flame of the burner is initially directed to a small localized area of the scrap on the outside of the scrap burden. It is difficult to transfer large amounts of energy from the burner by this localized impingement to the rest of the scrap efficiently. Until the burner has melted the scrap away from its face and has opened a larger heat transfer area, increasing a burner to maximum output would result in overheating and melting scrap pieces together producing the problems for the next stage of the EAF operation.

Therefore, it would be advantageous to be able to increase the amount of energy applied by a burner during the early part of the melting phase which did not produce a risk of flash back for the water cooled panels of the upper shell of the furnace. It would also be advantageous to use this increased amount of energy more efficiently and to transfer increased portions of the energy to the scrap burden without scrap agglomeration.

Conventionally, oxygen is blown or injected into the iron carbon melt where it reacts with the carbon in the molten bath to lower the carbon content to the level desired for the end product. In general, the rate of decarburization in an electric arc furnace is determined by the carbon concentration of the iron carbon melt, the oxygen injection rate and the surface area of the reactions sites. At higher bath carbon concentrations, the reaction rate is not significantly limited by the availability of carbon to enter the reaction. However, as the bath carbon decreases to concentrations under approximately 0.15%-0.20% of carbon, it becomes increasingly difficult to achieve an acceptable rate. This is because the carbon concentration of the bath becomes the decarburization rate determining factor. The decarburization rate, after the critical carbon content has been reached, is dominated by mass transfer of the carbon and the carbon concentration.

The prior art practice to decarburize an iron carbon melt is characterized by the localized application of a large volume of oxygen by means of devices such as lances and burner/lances. Due to the localized nature of this process, the decarburization rate depends on the rate of oxygen injection to the bath, the carbon concentration and the mass transfer of carbon to the reaction area. At lower carbon level contents, the iron oxide concentration in the slag near to the oxygen introduction area reaches levels greater than equilibrium would allow, due to depleted local carbon concentration and poor mass transport. This causes greater refractory erosion, loss of iron yield, increased requirements for alloys, and a low efficiency of oxygen utilization.

Therefore, it would be advantageous to provide a method and apparatus to supply oxygen for efficient decarburization of the iron carbon melt at all carbon concentrations. A method that increased the number of reaction zones and supplied significantly more effective oxygen early in the process would be advantageous because it would shorten the duration of decarburization. Particularly important is the efficiency of the oxygen supply after the iron carbon melt reaches a low carbon content in order to maximize the decarburization rate, without over oxidizing the slag and producing excess amounts of FeO. This would reduce operating costs by improving oxygen efficiency, reducing excess iron oxidation, improving alloy recovery, and increasing productivity.

The conventional oxygen injection equipment that has been used for decarburization is not generally suited for efficient introduction of oxygen into an iron carbon melt. The use of retractable consumable or water cooled lances through the slag door opening, or through the side wall, is always limited by the space available to position the equipment around the furnace. Its location is usually only practical in the quadrant of the furnace shell near the slag door. The basic furnace design, required manipulator movement, the size of the manipulator and the necessity of operators to observe the manipulator operation dictate the location of the manipulator. The design is also responsible for the introduction of a substantial amount of cold ambient air into the process through the slag door or side wall opening during manipulation of the moveable lance. These large amounts of cold air reduce the efficiency of the process and also contribute to a nitrous oxide increase in the furnace atmosphere. There is also a significant delay in moving the lance into the furnace through the scrap burden. The scrap must be melted in front of the lance before it can advanced into the hot reaction zone of the furnace where it can deliver effective oxygen.

Fixed oxygen injection equipment such as a burner/lance mounted on the side wall water cooled panels, or upper shells of the furnace are positioned a significant distance away from the iron carbon melt. That distance is generally determined by the geometry of the furnace side wall with respect to the transition from the upper shell to the lower shell of the furnace which forms a step. The water cooled part of the upper shell where the burner/lances have been located is mounted on the lower shell or refractory, but typically about 15-24 inches back from the hot face of the refractory. Because a fixed burner/lance has had to fire over this step, the traditional fixed wall oxygen injection equipment had to be located about 45 inches above the molten bath in an attempt to deliver oxygen with the optimum angle of impingement. This distance and the angle requires the length of the injected stream of oxygen to be about 65 inches or longer.

It is very difficult to deliver 1000 of an oxygen stream effectively to a reaction zone at these distances. The amount of effective delivery of a high velocity (high kinetic energy) oxygen stream to the iron carbon melt is proportional to the area of the oxygen injector opening (in the case of a converging-diverging nozzle the area of the nozzle's throat) and the distance the oxygen jet travels to the iron carbon melt. Thus, increasing the area of the nozzle throat increases the total amount of effective oxygen reaching the iron carbon melt, but may also result in an increase of unused oxygen in the furnace atmosphere. Another method of enhancing the effectiveness of an oxygen stream for decarburization has been to shroud it with the products of combustion, or other gases. The shrouding tends to maintain the stream together over a longer distance thereby increasing its penetrating power. In spite of the effectiveness gained by shrouding, it still has the limitation of how far the gases can travel without significant energy loss. Locating the oxygen injection device far from the melt results in a significant amount of the oxygen being lost to the furnace environment and causing several detrimental effects on operations. Initially, there is the increased cost of the shrouding gases and specialized equipment to form the shroud. The excess oxygen causes damage to the side wall panels, erosion of the shell refractory, development of excessive iron oxide in the slag, excessive electrode oxidation, reduction in the delta life, and may cause over heating of the furnace evacuation system.

Moreover, conventional oxygen injection equipment that has been used for decarburization is not generally suited to varying the oxygen supply rate over substantial ranges. Fixed oxygen injection equipment such as burner/lances mounted on the side wall panels of the furnace have the problem that they are positioned some distance away from the surface of the iron carbon melt. These fixed lances obtain their oxygen injection capability by a supersonic or high velocity nozzle which accelerates the oxygen such that its kinetic energy is enough to penetrate the surface of the iron carbon melt even from considerable distances. If the flow rates of these injectors are reduced significantly, the high velocity nozzles will not impart enough gas velocity to the oxygen to penetrate and create an efficient reaction zone for decarburization.

The introduction of particulates in EAFs has also increased with the requirements for the efficient processing of iron carbon melts and are usually introduced for slag production. The production of a correct slag composition for the iron carbon melt during the refining phase is important in achieving desired steel chemistry and in cleaning the steel of impurities. Foamy slag practice where the slag entrains gas bubbles, usually CO gas bubbles, and expands in volume to cover the electrodes) of the furnace and protect furnace components from the arc radiation is very desirable. Particulates, such as CaO and MgO, have been introduced to form slag and correct its chemistry to provide a good basis for slag foaming. Slag foaming is generally accomplished by the introduction of particulate carbon into the bath where it reduces FeO to Fe in an endothermic reaction producing CO bubbles which expand the volume of the slag and cause it to foam. The foamed slag acts as a blanket to hold in heat for the process and to shield furnace components from the radiation of the electric arc.

Also particulate carbon has been introduced into the EAF environment for the chemical adjustment of the carbon content an iron carbon melt. Normally, carbon is added to a melt for cleaning purposes or to increase the carbon content if the carbon content of the original iron burden melted had been too low for the grade of steel desired.

Carbon has also been added to a slag which has high percentage of FeO to recover Fe from the slag to increase the yield of the steel. U.S. Pat. No. 4,362,556 issued to Kashida describes the process of recovering Fe from the slag by reducing it with introduced particulate carbon. The carbon introduction is disclosed as being lanced with a pipe, either by itself or simultaneously with the introduction of oxygen.

Carbon has in the past been introduced into the EAF by a number of methods including adding it to the buckets of scrap which are being melted or by shoveling it through openings in the EAF, including ones in the roof, sidewalls and the slag door. This has proved inefficient and other methods, such as moveable lances and fixed multimode burners, are now used. U.S. Pat. No. 5,599,375 issued to Gitman, et al. illustrates a multimode burner which injects a simultaneous mixture of oxygen and particulate carbon in an EAF. U.S. Pat. No. 4,986,847 issued to Knapp discloses a slag door manipulator which simultaneously intersects streams of oxygen and carbon before injection into the furnace.

The incorporated Shver applications disclose a furnace apparatus mounting configuration which allows a multimode burner/lance to be moved closer to the step of the furnace. The mounting enclosure and burner/lance configuration moves the burner flame away from the sidewall panel to eliminate the chance for flashback and water cooled panel damage. A more aggressive oxygen lancing practice can be used without risk of damaging the sidewall panel and a more optimal oxygen consumption can be achieved.

Similarly to the conventional burner/lance mounting configuration, a carbon injection stream is required to travel the same large distance that a conventional oxygen jet must travel. Often the suction of the direct evacuation system is strong enough to disrupt the carbon stream as it travels from the sidewall to the melt and thereby reduces the effectiveness of slag foaming. The large distance which the conventional carbon injection stream must travel also reduces the velocity and energy with which it may penetrate the slag. Slag foaming is much more effective when the carbon stream can produce an intense agitation of the slag at its place of introduction.

Therefore, it would be advantageous to provide a particulate injection process for EAF steelmaking, especially particulate carbon, which will introduce the particulates low in the furnace and close to the slag/metal interface. The introduction of particulates in this manner will maximize the kinetic energy of the stream for penetrating and agitating the slag. It would also be advantageous for the particulate injection to be accompanied by the injection of burner flames and decarburizing oxygen low in the furnace and close to the slag metal interface.

Prior art lances or burner/lances which simultaneously inject oxygen and carbon have the problem of being located far from the melt and other drawbacks. The oxygen and carbon are generally mixed at the end of two nozzles by intersecting the flows far away from the iron carbon melt. Because the intersection angle is fixed at the time of mounting, these conventional carbon and oxygen injection apparatus are only aligned or aimed to be effective when the iron carbon melt is at one level. This level is usually chosen as the designed flat bath or fully melted level of the furnace. However, no furnace actually operates at that level as most are either overloaded or under-loaded to some degree in day to day operation. The designed level even changes as the refractory of the furnace wears being higher at the start of a refractory regime and lower at the end. Further, before a full scrap burden level is reached in normal EAF operation, several scrap buckets must go through the melting cycle and it is not until the last bucket is entirely melted that the full level of the furnace is even approached. Other conventional steel making processes have variable level baths, such as melting direct reduced iron (DRI), or a ConSteel process. Therefore, these simultaneous carbon and oxygen injection systems are not very efficient over much of the scrap melting steel making process and almost ineffective for many other conventional steel making processes.

Therefore, it would be of advantage to provide a particulate injection process for EAF steel making where the flows of oxygen and carbon were substantially parallel to each other and did not intersect. A substantially parallel introduction of each stream low in the furnace and close to the slag/metal interface would provide effective decarburization and effective slag foaming to begin early in the process and at low bath levels. Further, the introduction of flows which did not intersect also would be effective over a wide range of bath levels.

Another drawback of the simultaneous oxygen and carbon systems which intersect the flows is the use of the carbon as a fuel and not for metallurgical purposes. This drawback increases the farther away they are introduced from the melt and their misalignment. The most efficient use of supersonic oxygen is to decarburize the melt and the most efficient use of carbon injection is to foam the slag and reduce the FeO in the slag. When mixed externally from the melt and slag, the oxygen and carbon combine to produce a flame leaving less of these elements for their intended uses. Further, their combined presence in one reaction zone slows the principle reactions desired (the decarburization of Fe and the reduction of FeO) as they are more reactive with each other than with their intended metallurgical combinations. The exothermic reaction of the carbon and oxygen merely produces an insignificant amount of uncontrollable heat while reducing the efficiency of and slowing the more desired processes.

Therefore, it would be advantageous to provide a particulate injection process for an EAF in which the reaction zone for decarburization is in close proximity to, but separate from the reaction zone for the reduction of FeO. This will maximize the primary reaction for the carbon, while at the same time ensuring efficient FeO reduction and maximum slag foaming. It would also be advantageous, however, if the two zones worked effectively together where the FeO produced by the decarburization zone was actively reduced in the particulate reaction zone.

BRIEF SUMMARY OF THE INVENTION

The invention provides a method and apparatus for improving the injection of particulates in furnaces used for metal melting, refining and processing. Preferably, the method and apparatus are useful for injecting particulate carbon in the steel making operation of an electric arc furnace. The particulate injection is advantageously accomplished either alone, or in combination with the injection of one or more other flows, such as a flame comprised of combustion products or a flow of oxidizing gas for decarburization.

According to one aspect of the invention used in a steel making process in an electric arc furnace, the duration of the process is decreased by adding increased amounts of chemical energy early in the process with the combustion products of a burner/lance flame which is directed into a more efficient combustion reaction zone, preferably below the refractory line of the furnace. When the burner flame is generated at this position of the furnace, several distinct advantages pertain to a steel making process. For a scrap melting process, the clearing of a path for an injection of high velocity oxygen and particulates is facilitated because there is less path length to clear and it can be done faster. The time for melting the path length is further reduced by increasing the burner output to its maximum rating early in the melting phase. With a positioning of the flame below the refractory line, there is substantially less possibility for a flash back and the refractory can withstand such operation without catastrophic failure. The process of melting a clear path is also faster because the flame works in a hotter area closer to the electric arc. Further, the hot combustion gases flow upward through the total burden of scrap and cause additional energy transfer instead of heating the furnace atmosphere. For steel making processes in which there is no scrap path to melt, the early introduction of the flame is more efficient because of the deceased path length to the iron carbon melt.

In addition to the efficiency gain caused by starting the oxidizing gas and particulate flows early in the steel making cycle, the invention includes a process for increasing the efficiency of the oxidizing gas utilization in the iron carbon melt and includes a process for increasing the efficiency of the particulate carbon utilization in the slag. More particularly, the method preferably includes supplying a plurality of oxidation reaction zones with an oxidizing gas to decarburize an iron carbon melt with an efficient oxygen supply profile which is related to the carbon content of the melt. The multiple oxidation reaction zones are used to increase the amount of oxygen which can be effectively used for decarburization of the melt by increasing the reaction zone area and by making each oxidation reaction zone more efficient. Each oxidation reaction zone is more efficient because the surface dynamics of the process are occurring in multiple localized areas. The carbon being depleted in each local area is replenished more quickly than a single large area because of the better mass transport. This will lower the duration the decarburization process and at the same time oxidize less iron. The method includes supplying a plurality of particulate reaction zones with particulate carbon for foaming slag, the reduction of FeO in the slag and/or the recarburization of the iron carbon melt. The multiple particulate reaction zones are used to increase the amount of particulate carbon which can be effectively used for foaming slag, the reduction of FeO in the slag and/or the recarburization of the iron carbon melt by increasing the reaction zone area and by making each particulate reaction zone more efficient. Each particulate reaction zone is more efficient because the surface dynamics of the process are occurring in multiple localized areas.

A preferred embodiment of the apparatus includes a plurality of injection apparatus which efficiently supply combustion gases, high velocity oxidizing gas, and high velocity particulates to the respective reaction zones. The injection apparatus preferably comprises a fixed burner/lance which is capable of injecting combustion gases and high velocity oxygen, preferably at supersonic velocity, and a particulate injector capable of injecting at least high velocity carbon particles entrained in a carrier gas. In the illustrated embodiment, the high velocity oxygen is developed by a nozzle structure of a burner/lance which accelerates the oxidizing gas to supersonic velocity. The nozzle structure of the burner/lance can also includes fuel and secondary oxidizing gas jets which are used after combustion to form a shroud around the high velocity oxygen and maintain its penetrating power over greater distances.

The burner/lance and particulate injector are mounted in a protective mounting enclosure which allows the nozzle structure of the burner/lance and the discharge end of the particulate injector to be located closer to the surface of the melt and closer to the center of the furnace than prior fixed apparatus mounted on the side wall panels. The protective mounting enclosure in the preferred embodiment is fluid cooled and has at least one hot face adapted to withstand the harsh environment of the inside of the furnace. The burner/lance and particulate injector are mounted at an optimal attack angle through mounting apertures in this hot face.

Mounting the burner/lance and particulate injector in a protective mounting enclosure produces several advantages. The protective enclosure moves the burner flames, high velocity oxygen flow, and particulate flow away from the wall of the furnace and closer to the edge of the refractory. This greatly reduces or eliminates the chance that the burner flames or the high velocity oxygen flow will be reflected (flashback) against the furnace wall and create damage. Advantageously, the high velocity oxidizing gas flow and particulate flow have a shorter distance to travel to reach the melt compared to an apparatus mounted on the side wall.

The shorter flow path length permits the oxidizing gas flow to impinge on the melt with a higher velocity and more concentrated flow pattern which causes a more efficient and rapid decarburization. The shorter flow path length also eliminates the need for excessive shrouding gases and oxygen jets with large flow rates. This significantly reduces the negative oxidizing effects to the furnace related to excess oxygen. The shorter flow path length permits the particulate flow to impinge on the slag layer with a higher velocity and more concentrated flow pattern which causes intensive slag agitation and, as a result, rapid production of foamy slag and consequent reduction of the FeO in the slag.

Further, the shorter flow path length provided by the mounting enclosures and multiple zones permits reduced flow rates at each zone, allows the flow of the oxidizing gas and particulates at each zone to be controlled over a substantial range while still maintaining high velocity and efficient penetrating power for the melt and slag at each zone. The capability of the preferred apparatus to permit the control of the oxidizing gas flow rate over a substantial range while still maintaining efficient decarburizing velocity facilitates the supply of an oxidizing gas profile to each reaction zone which is related to the carbon content of the melt.

According to another feature of the invention, the apparatus in the mounting enclosure provides an oxidizing gas flow, preferably from the burner/lance, and a particulate carbon flow preferably from the particulate injector, which are substantially parallel and substantially at the same injection angle. This is advantageous because the flows do not intersect each other in traveling to the slag and the melt. The flows impinge on the slag and melt to form separate reaction zones which essentially move together as the bath level changes. The oxidizing gas flow penetrates the melt to provide effective decarburization in the oxidation reaction zone and the particulate carbon flow penetrates the slag to provide effective reduction of FeO and/or slag foaming in the reaction zone. These effective reaction zones can be established early in the steel making process and remain efficient over a wide range of levels of the bath. Preferably, the zones may be started during the melting phase for a conventional scrap melting EAF or at the beginning of DRI introduction for an EAF which is charged with scrap and/or hot iron and continues to charge DRI from the top. Beginning the effective reaction zones at the start of the process is beneficial for an EAF using a ConSteel process where scrap is continuously charged into the bath by different type of conveyers.

According to still another aspect of the invention, the oxidation reaction zone and particulate injection zone are located independently but synergistically with respect to each other to facilitate the desired reactions in each. Preferably, at least one particulate reaction zone is located on the periphery of an oxidation reaction zone to separate the reactions so they do not substantially interfere with one another.

Each oxidation reaction zone will produce FeO in the slag along with CO and heat from the oxidation of carbon in the melt. The amount of FeO produced in the slag will depend upon the amount of oxygen being used at the time, temperature, the carbon content of the melt and the percentage of FeO already in the slag. Due to the natural circulation of the slag caused by the magnetic field of the electrodes (typically counter clockwise in either an AC or DC furnace) there will be an downstream side of each oxidation reaction zone where slag with high concentrations of hot FeO will exit the zone. Preferably, an associated particulate reaction zone is located downstream of at least one oxidation reaction zone to recover a part of this FeO and to foam the slag. Another benefit is that the slag is cooled by the endothermic reaction of the particulate carbon which will increase its viscosity. The increased viscosity of the slag and production of CO bubbles from the reduction reaction will produce a stable and vigorous foamy slag.

Additionally, the hot FeO in each oxidation reaction zone is reactive and when it comes into contact with the refractory of the furnace the life of the refractory is reduced. Preferably, at least one associated particulate reaction zone is located between at least one oxidation reaction zone and the furnace refractory to recover a part of the hot FeO before it reaches the refractory. In this situation the endothermic reaction with the particulate carbon and FeO also cools the slag and makes the remaining FeO and slag less detrimental to the refractory.

Injection apparatus according to the invention can also be used for an improved method for recarburizing an iron carbon melt. The injection apparatus for this purpose preferably comprises a fixed burner which is capable of injecting combustion gases and a particulate injector capable of injecting at least high velocity carbon particles entrained in a carrier gas. The burner and particulate injector are mounted in a protective mounting enclosure which allows the nozzle structure of the burner and the discharge end of the particulate injector to be located closer to the surface of the melt and closer to the center of the furnace than prior fixed apparatus mounted on the side wall panels. The protective mounting enclosure in the preferred embodiment is fluid cooled and has at least one hot face adapted to withstand the harsh environment of the inside of the furnace. The burner and particulate injector are mounted at an optimal attack angle through mounting apertures in this hot face.

Multiple injection apparatus which efficiently supply combustion gases and high velocity carbon particulates to the respective reaction zones are used in a process to add carbon content to the iron carbon melt. The flows of combustion gases are applied at the same time or substantially the same time as the flows of carbon particulates to increase the carbon level of the melt. The separate reactions zones allow the combustion gases to heat the slag to reduce its viscosity without burning the carbon. The carbon is injected into the thinner slag and can more efficiently penetrate through to the iron carbon melt. The shorter injection distance to the melt provided by the mounting enclosure permits the carbon particles to impinge on the melt with greater velocity so that they can be incorporated easily therein. The multiple carbon injection points allow relatively large amounts of carbon to be added to the iron carbon melt quickly and with a uniform distribution. This shortens the duration of the recarburization process and allows the bath to come to equilibrium in an optimal amount of time.

These and other objects, aspects and features of the invention will be more clearly understood and better described when the following detailed description is read in conjunction with the attached drawings, wherein similar elements throughout the views have the same reference numerals, and wherein;

DETAILED DESCRIPTION OF THE INVENTION

Figure 1:
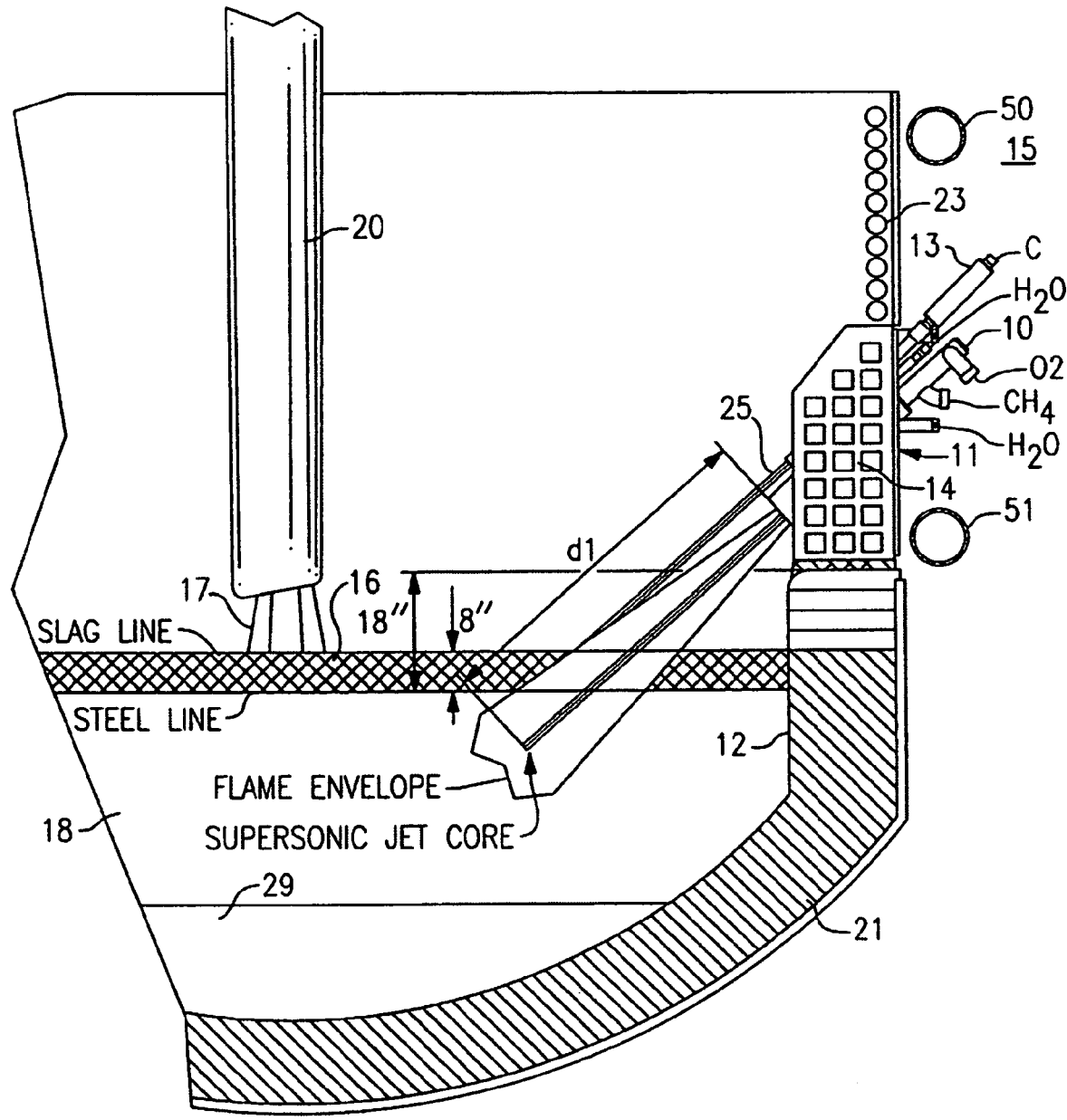
FIG. 1 is a partially cross-sectioned side view of a first embodiment an injection apparatus mounted on an electric arc furnace which is capable of more efficient operation for melting, decarburization of an iron carbon melt and introduction of particulates and which is constructed in accordance with the invention.

Referring to FIGS. 1-5, a plurality of injection apparatus 11 are adapted to operate in several different modes to provide auxiliary heating, metal refining, particulate injection and other metallurgical processing capabilities for an electric arc furnace (EAF) 15, or similar furnace for metal melting, refining and processing. The injection apparatus 11 are capable of providing flows of combustion gases, high velocity oxidizing gas, and high velocity particulates either singularly or in any combination.

In an illustrated first embodiment in FIGS. 1-4, the injection apparatus 11 preferably includes a burner/lance 10, a particulate injector 13 and a mounting enclosure 14. Preferably, the burner/lances 10 can be those described previously in the Shver, Shver, et al. I or II references, but they could also be other commercially available air fuel burners; oxygen fuel burners; oxygen, air and fuel burners; and/or oxygen injectors. Preferably, the particulate injector 13 comprises a hollow pipe through which particulates entrained in a carrier gas, such as carbon particles carried by pressurized air, can be introduced into the furnace 15. Preferably, the mounting enclosure 14 can be any those disclosed in the incorporated references, U.S. application Ser. Nos. 09/502,064; 09/875,153; or 09/902,139. Specifically, additional details as to the construction and operation of the injection apparatus 11 of FIGS. 1-4 are disclosed in Ser. No. 09/902,139.

While the preferred embodiments of the invention will be described using and mounting such burner/lances and particulate injectors in the disclosed mounting enclosures, it will be evident that other similar apparatus, such as consumable, or water cooled fixed lances, retractable lances, or the like, can be used with the invention to produce advantageous results.

The invention will be useful for any metal melting, refining or processing furnace having apparatus with a discharge opening whose efficiency can be increased by placing the discharge opening closer to the surface of the molten metal or closer to the center of the furnace. Particularly, the invention will be advantageous for those apparatus, such as burner/lances and lances, which have a lancing capability with a high velocity oxidizing gas, such as supersonic oxygen, and for those apparatus, such as particulate injectors, which have a injection capability with a high velocity particulate flow, for example carbon particles entrained in a high velocity carrier gas.

FIG. 1 shows a partially sectioned side view of the electric arc furnace 15. The EAF 15 melts ferrous scrap, or other iron based materials, by means of an electric arc 17 produced from one or more electrodes 20 to collect a molten metal bath or melt 18 at its hearth 21. The burner portions of the burner/lances 10 assist in the scrap melting process, or add heat to other processes, by introducing high temperature flames and combustion products which transfer heat to the scrap or other burden. The metal bath level varies significantly during the melting process. The bath level generally begins with a hot heel level 29 which is the iron melt left from the previous heat. As multiple charges of scrap or other iron base materials are melted the level rises. The furnace can be filled to a level about 18 inches down from the sill line. Other steel making processes such as DRI melting and the ConSteel process produce similar bath level changes. The generally spherical shaped hearth 21 is made of refractory material to withstand the high temperature of the molten metal. As best seen in FIG. 5, the hearth 21 of the EAF 15 is surrounded by an upper shell which is comprised of a series of arcuate fluid cooled panels 23. It is known that the fluid cooled panels 23 forming the side wall of the furnace 15 can be of several conventional types. These panels are supplied with cooling water from circumferential supply conduits 50 and 51 (FIGS. 1-4) which are connected to cause water to circulate through the panels 23 and then exit to carry off heat. The injection apparatus 11 may also be supplied by conduits 50 and 51 or have independent fluid cooling supplies.

Returning to FIG. 1, the melt 18 consisting of iron and carbon is generally covered with various amounts of slag 16 which is produced by the chemical reactions between the melt and slag forming materials added to the furnace before or during the melting process of the metal. Once the scrap metal or other burden has been melted, the metal bath 18 is generally refined and decarburized by oxygen lancing. This produces the required chemistry for the melt and reduces the carbon content of the metal to the grade of steel desired. After the electrodes are turned on, a foamy slag may be developed by injecting particulate carbon to protect the furnace components from radiation form the arc. During refining and thereafter, the metal bath 18 is typically heated by the electric arc 17 above its melting temperature. This superheating allows the melt to boil and continue the carbon oxidation with the lanced oxygen. The superheating is also used to allow the metal bath 18 to remain fluid while being transported in a ladle or other carrier to another process step. If the melt 18 does not contain an adequate carbon level for the grade of steel desired then it must be recarburized by adding carbon to the bath. The melt 18 may lack an adequate carbon level because of the materials which were melted to form the bath or because oxygen lancing has decreased the carbon content to below that desired.

The injection apparatus 11 may assist in one or more of these phases of steel making. For example, heat may be added at any necessary time by the burner portion of burner/lance 10 such as for scrap or other burden melting. Oxygen lancing for cutting scrap or supersonic oxygen lancing for decarburization may take place when desired from the lancing portion of the burner/lance 10. The high velocity, preferably supersonic, oxidizing gas lancing may be accompanied by a flame shroud form the burner portion of burner/lance 10 for part or all of its duration. Slag forming particulates or slag foaming, preferably carbon particles, particulates may be injected when desired by the particulate injector 13. Recarburization may be accomplished by the particulate injector 13 injecting particulate carbon at the desired time with or without the assistance of the burner portion of the burner/lance 10. FIG. 1 illustrates that flows of the high velocity oxidizing gas (supersonic jet core) may be accompanied at least part of the time by flows of the combustion gas (flame envelope) and particulates 25. These flows can be injected early in the melting process at initial bath levels and as the bath level rises to a full level.

Figure 2:
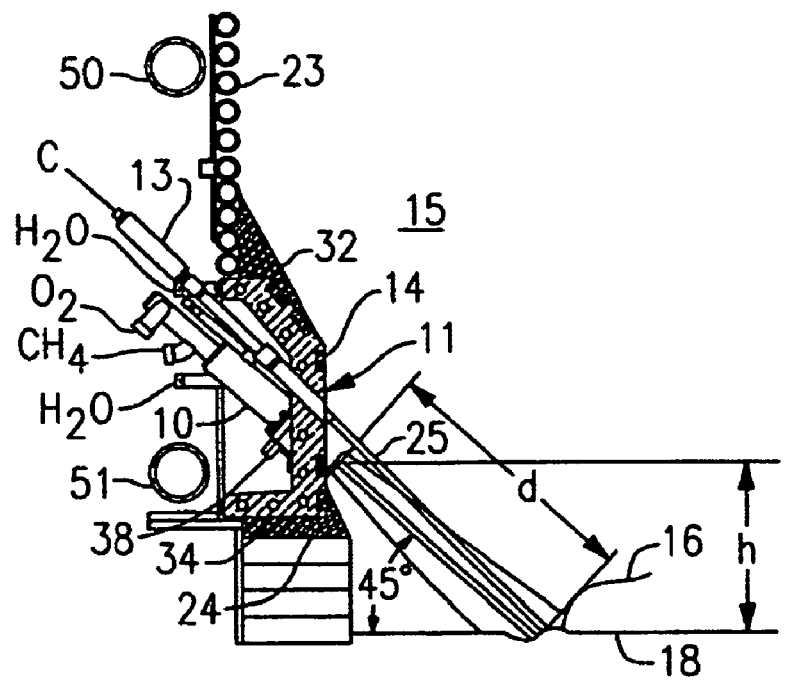
FIG. 2 is a cross-sectioned side view of the injection apparatus illustrated in FIG. 1 which shows the burner/lance and particulate injector of the apparatus.
Figure 3:
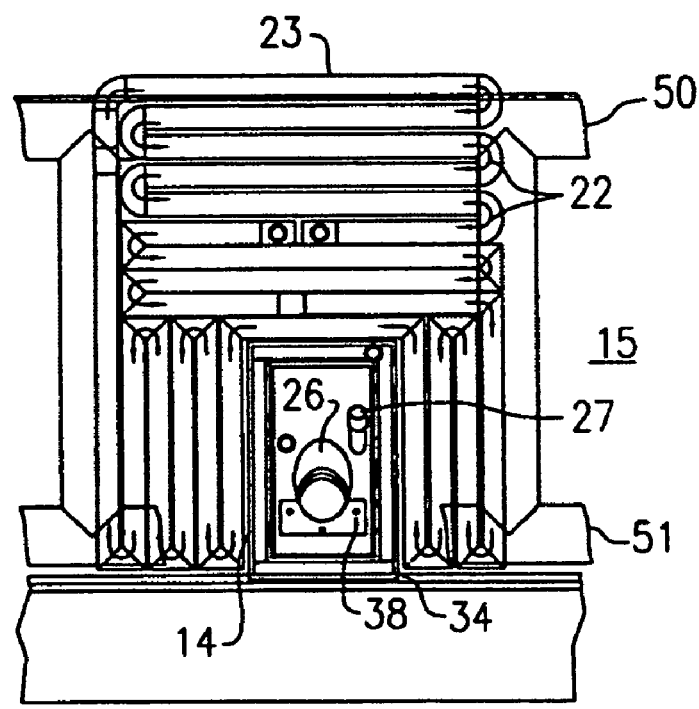
FIG. 3 is a rear view of the injection apparatus illustrated in FIG. 1 which shows the mounting enclosure without the burner/lance and particulate injector of the apparatus.
Figure 4:
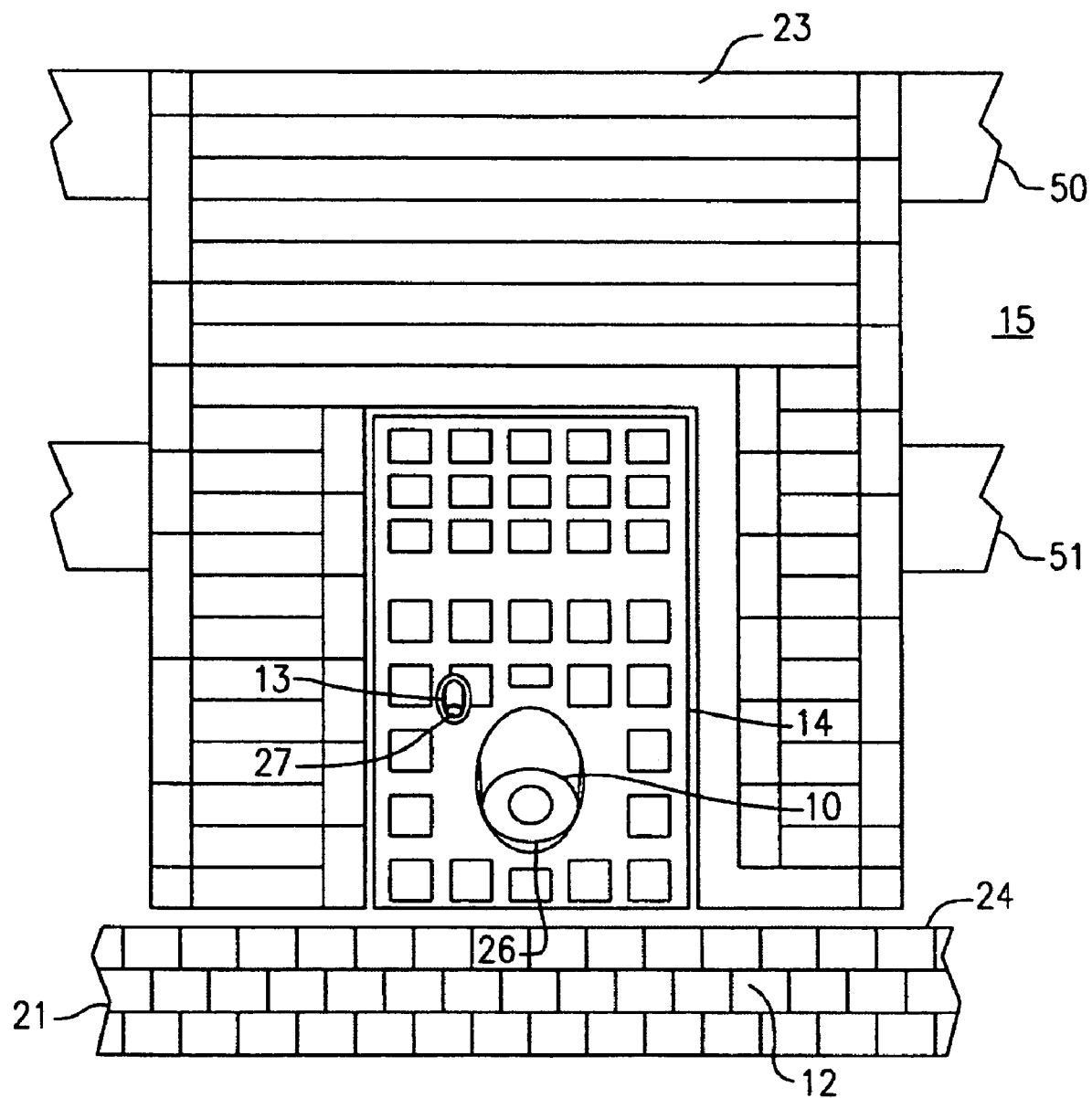
FIG. 4 is a front view of the injector apparatus illustrated in FIG. 1.
Figure 5:
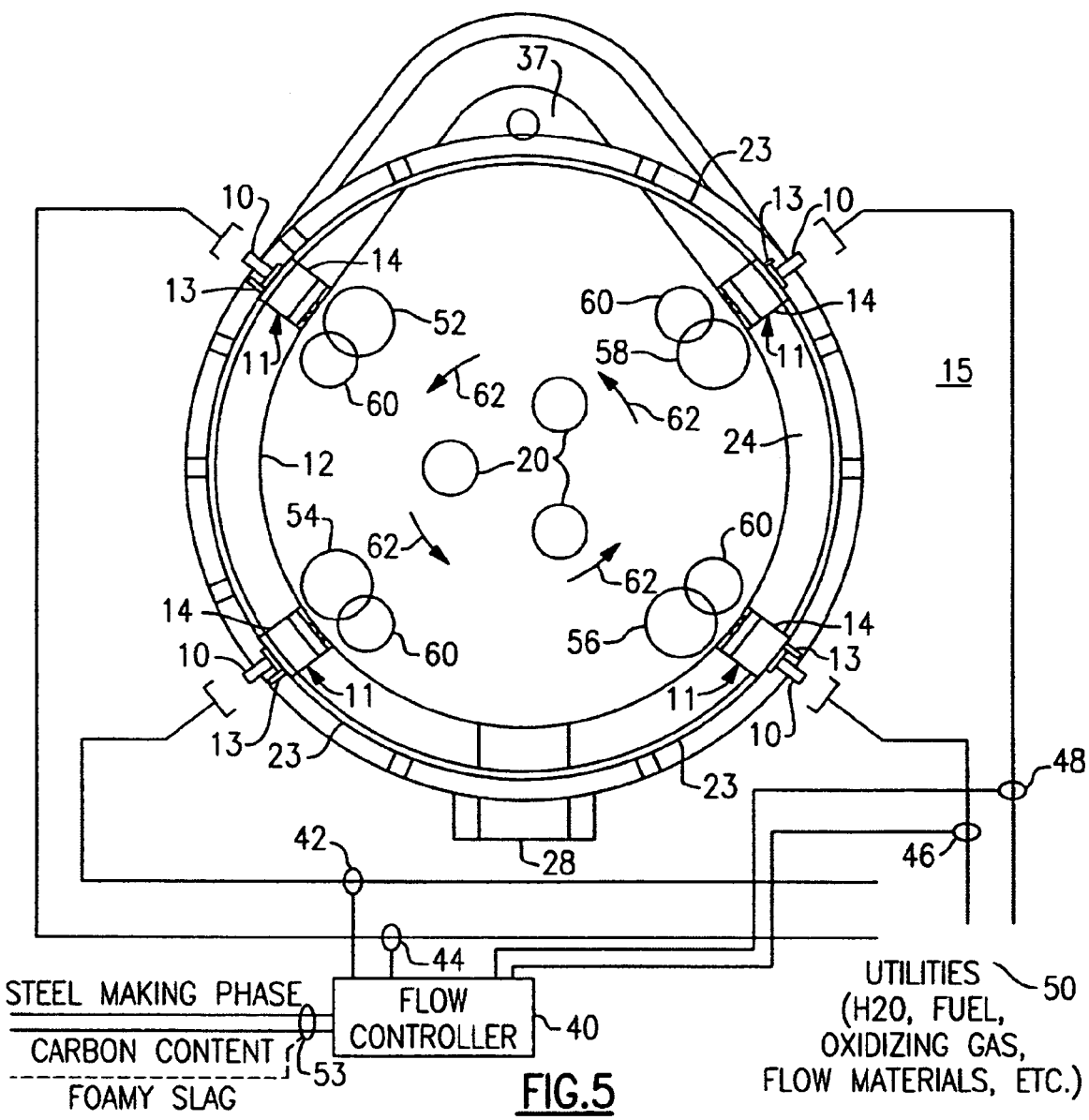
FIG. 5 is a partially cross-sectioned plan view of a multiple injection apparatus configuration for the electric arc furnace illustrated in FIG. 1 illustrating a plurality of the injector apparatus and a flow controller for regulation of their operation.

In FIGS. 2-4, the burner/lance 10 and particulate injector 13 are preferably mounted through an opening in the fluid cooling coils of a side wall panel 23 of the furnace 15 with generally rectangular shaped mounting enclosure 14. In the illustrated embodiment, the mounting enclosure 14 preferably rests on the step 24 formed between the panels 23 of the side wall of the upper shell of the furnace 15 and the refractory of the hearth 21, but could also be supported or suspended from another suitable structural member of the furnace 15. To provide thermal contact between the mounting enclosure 14, the step 24, and coils 22, a refractory ramming material 34 is used to close any gap around the bottom and sides of the enclosure. The mounting enclosure 14 is shown located on the inside of the cooling coils 22 of the side wall panel 23.

The burner/lance 10 is received in a mounting aperture 26 of the mounting enclosure 14 so that its discharge opening or face is extended near the hot edge 12 of the refractory of hearth 21. The burner/lance 10 is secured to the mounting enclosure 14 by bolting it to a flange 38. This allows the flow of materials from the discharge opening of the burner/lance 10 to miss the edge of the step so as to not degrade the refractory, particularly with a high velocity oxidizing gas. The mounting of the discharge opening of the burner/lance 10 over the step also brings the gas flows from the burner 10 close to the surface of the melt 18 and close to the center of the furnace 15 thereby making the process operation more efficient. The mounting enclosure 14 also provides protection for the burner/lance 10 from the intense heat of the furnace 15 and mechanical damage from falling scrap 13. In normal operation a slag covering 32 forms on the mounting enclosure 14.

The particulate injector 13 slides into a mounting tube 27 fixed in the mounting enclosure 14 so that its discharge opening or face is extended near the hot edge 12 of the refractory of hearth 21. This allows the flow of materials from the discharge opening of the particulate injector 13 to miss the edge of the step and not be dispersed. The mounting of the discharge opening of the particulate injector 13 over the step also brings the particulate flow close to the surface of the melt 18 and close to the center of the furnace 15 thereby making the process operation more efficient. The mounting enclosure 14 also provides protection for the particulate injector 13 from the intense heat of the furnace 15 and mechanical damage from falling scrap 13.

The burner/lance 10 is typically slanted downward at a mounting angle in the mounting aperture 26, preferably between 30-60 degrees, to direct a material flow from the burner/lance 10 comprised of combustion products, high velocity oxidizing gas, combinations thereof and/or other flows of injected materials, toward the metal melt 18 in the hearth 21 of the furnace. In addition to its downward inclination, the burner/lance 10 may also optionally be directed from a radial direction (center of the furnace), preferably from 0-15 degrees. To cause suitable penetration of the metal bath 18 without splashing, a supersonic flow of oxidizing gas, preferably oxygen, should impinge at an angle which is neither too shallow nor too steep. If the angle is too steep, excessive steel and slag splashing may occur. If the angle is too shallow, then the flow may not sufficiently penetrate the surface of the melt 18. More preferably, an angle of approximately 45.degree. (.+−. 10.degree.) has been found to be efficacious in producing desirable results from lancing with combustion products and a high velocity oxidizing gas.

The particulate injector 13 is typically slanted downward at a mounting angle in the mounting tube 27, preferably between 30-60 degrees, to direct a material flow from the particulate injector 13 comprised of various slag forming or foaming agents, particulate carbon entrained in a carrier gas, combinations thereof and/or other flows of injected materials, toward the metal melt 18 in the hearth 21 of the furnace 15. In addition to its downward inclination, the particulate injector 13 may also optionally be directed from a radial direction (center of the furnace), preferably from 0-15 degrees. To cause suitable penetration of the slag and agitation the flow of particulates should impinge at an angle which is neither too shallow nor too steep. If the angle is too steep, excessive steel and slag splashing may occur. If the angle is too shallow, then the flow may not sufficiently penetrate the surface of the slag. More preferably, an angle of approximately 45.degree. (.+−. 10.degree.) has been found to be efficacious in producing desirable results from high velocity particulate flows.

Depending upon the configuration of the furnace 15, as seen in the plan view in FIG. 5, the injection apparatus 11 may be mounted anywhere along on the side wall of the upper shell. Individual burners/lances or burners (not shown) may also be mounted in, or above the slag door 28 of the furnace 15, and in or above sump 27, if it is an eccentric bottom tapping furnace. Generally, a modern furnace 15 has more than one injection apparatus 11 mounted around its periphery; the number depending upon its size, configuration, melting power and operation.

Generally, the injection apparatus 11 are strategically located along the side wall 23 for a number of different purposes. For example, the injection apparatus 11 may be mounted at the cold spots in the furnace so that the burners may assist with the melting of scrap metal. These cold spots are different for DC (Direct-Current) furnaces and AC (Alternating Current) furnaces, and may be different even between these types of furnaces depending on size, manufacturer, and the operating procedure of the furnace. Positioning may also depend on the specific of operation the EAF with different processes, such as scrap melting, continuous charging of DRI, or the ConSteel processes. It may also depends on the other factors such as the materials which are introduced into the furnace by the burner/lance 10 and particulate injector 13 and the purpose and timing of their introduction. Other materials which can be introduced include metallurgical and alloying agents, slag forming and foaming agents, oxidizing gases for refining, melting, decarburization agents, post combustion gases, etc. The mounting enclosure 14 of the injection apparatus 11 can be positioned and advantageously mount a burner/lance 10, particulate injector 13 and/or similar apparatus wherever they need to be on the side wall of the furnace 15 and for a variety of purposes.

In the preferred embodiment, there are four injection apparatus 11 which are equally spaced around the periphery of the furnace 15. The configuration, according to the invention, is used to provide a uniform distribution of oxidation reaction zones 52, 54, 56 and 58 for decarburization and uniform distribution for particulate reaction zones 60 for forming and foaming slag, reducing FeO, and recarburization, among other things. The oxidizing gas reaction zones 52, 54, 56 and 58 are representations of the areas where the high velocity oxidizing gas penetrates the slag and iron carbon melt and an oxidizing reaction, termed decarburization, between the lancing gas and the bath carbon occurs. The particulate reaction zones 60 are where the particulates penetrate the slag and react chemically with the slag to provide the correct viscosity, composition and foaming. By providing a plurality of reaction zones, the invention not only produces a more uniform distribution of the oxidizing gas and particulates but also more area in which the desired reactions can occur. This allows increased amounts of effectively used oxidizing gases where they contribute to reducing the decarburization time, not to over oxidizing the iron carbon melt or producing free oxygen in the furnace atmosphere.

Figure 6:
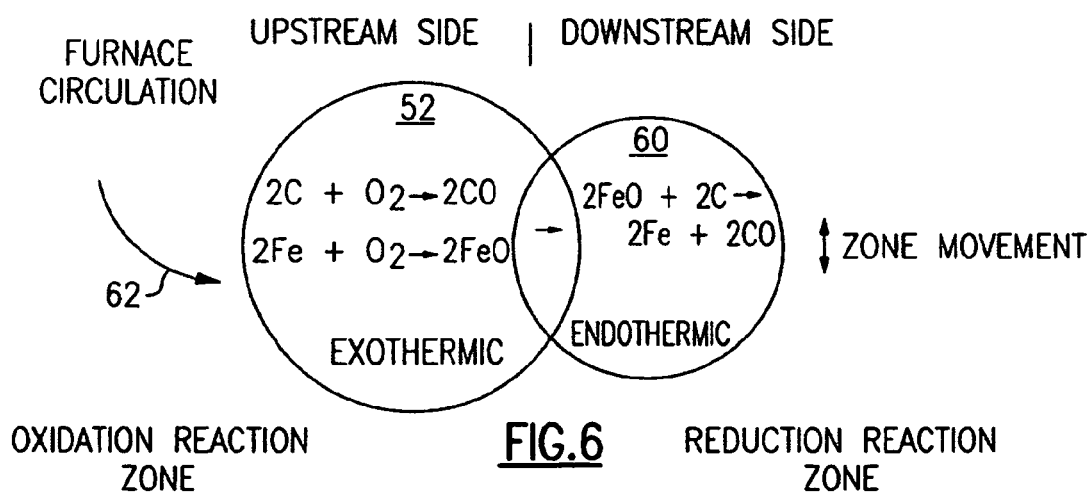
FIG. 6 is a pictorial representation of the reactions occurring in the oxidizing gas reaction zone and the particulate reaction zone for the injection apparatus shown in FIG. 1.

One of the oxidizing reaction zones 52 and its associated particulate reaction zone 60 are more detailed in FIG. 6. The injection components of the injection apparatus 11 are mounted to direct the flows of oxidizing gas and particulate carbon in substantially parallel paths. The oxidizing gas flow impinges on the slag and melt at area 52 and penetrates the slag and melt. Exothermic reactions of oxidation occur to decarburize the melt ($2C+O_2=2CO$) and to form ferric oxide ($2Fe+O_2=2FeO$). The heat and FeO remain in the slag, which circulates through the zone 52 counter clockwise around the furnace due to the force produced by the magnetic field of the EAF 15. The hot FeO in the slag enters particulate reaction zone 60 by way of furnace circulation because of its downstream location. The particulate carbon flow impinges on the slag and melt at area 60 and penetrates the slag. A reduction reaction occurs so as to recover a part of the Fe and form CO gas ($FeO+C=Fe+CO$) which is endothermic. The endothermic reaction helps cool the slag in area 60 to increase its viscosity thereby assisting in the trapping of the CO gas in bubbles to vigorously foam the slag.

Importantly, because of the parallel direction of the particulate carbon and oxygen flows, one reaction zone does not interfere with the primary chemical reaction in the other zone. The positioning of the (reduction) particulate reaction zone on the downstream side of the oxidation reaction zone enhances the reduction reaction and slag foaming. Moreover, because the flow directions of the carbon and oxygen are substantially parallel, the zones will move together as the level of the bath changes (toward the side wall as it increases and away from the sidewall as it decreases) Therefore, the flows will always be focused together. The reaction zone movements are minimized by the high injection angle allowed by the positioning of the discharge ends of the injection apparatus 10 and 13 over the step 24. All of the factors combine in providing stable reaction zones and in improving the effectiveness of the desired reactions and the steel making process.

Whatever the other functions or modes the burner/lances 10 may have, it is important when an oxidizing gas lancing mode is provided, that the apparatus be closer to the surface of the melt and be directed more to the center of the furnace. Further, when a multimode burner/lance 10 has a burner mode which assists in melting scrap and/or clearing a pathway through the scrap for the lancing mode, it is important that the apparatus be closer to the surface of the melt and be directed more to the center of the furnace. Similarly, the particulate injection is increased in efficiency when operated closer to the surface of the melt and directed more to the center of the furnace. The mounting enclosure 14 provides an extension for mounting the burner/lance 10 and particulate injector 13 beyond the water cooled panels 23 of the furnace 15 to allow their discharge openings to reach beyond the step 24 of the refractory of the hearth 21 and be closer to the center of the furnace.

In the illustrated system embodiment of FIG. 5, the burner/lances 10 are preferably conventional multimode apparatus which have a burner function and a lancing function. A burner/lance provides one apparatus for the injection of thermal energy to assist in the melting phase of the steel making process and for the injection of high velocity oxidizing gas to decarburize the iron carbon melt. The burner function of the burner/lances 10 is provided by mixing an oxidizing gas, preferably oxygen, and fuel, preferably natural gas, which produces a flame comprised of combustion gases having a high heat content. The thermal energy of the combustion gases may be transferred to the scrap metal which is melted in the furnace through radiation and convection, or a combination of these, as is known.

To control the burner function, a flow controller 40 is used to control the flows of oxidizing gas and fuel to each of the burner/lances 10 by means of flow control actuators and sensors groups 42, 44, 46, and 48 located in the supply paths between the burner/lances 10 and utilities 50. The flow controller 40 preferably is a programmable device which has a program for independently controlling the burner function for each burner/lance 10 as to at least its oxidizing gas/fuel ratio and its thermal power output. Preferably, the flow controller 40 additionally controls the lancing function of each of the burner/lances 10 through its program as to the amount (flow) of high velocity oxygen and its timing. Optionally, the flow controller 40 has as part of its program the control of a flame for shrouding the high velocity oxidizing gas to increase its effective penetrating power of the iron carbon melt. The flow controller 40 also controls the particulate injection of the particulate injectors 13 through its program with the actuators and sensors as to the amount (flow) of high velocity particulates and their timing. Optionally, the flow controller 40 may include as part of its program the receipt of operator commands which control the timing of the starting and stopping of particulate flow.

The flow controller 40 also receives inputs 53, either manually, from sensors, from another programmed control (for example, a controller regulating the electrical energy of the arc) or from an internal timer indicating the phase of the steel making process, carbon content of the iron carbon melt and an indication whether an adequate foamy slag has been established. The flow controller 40 uses these physical parameters of the furnace 15 to determine by its program when the modes of the burner function should be changed, when the burner function should be changed to the lancing function, and how the lancing function should be varied.

Conventional mounting configuration for a burner/lance or a particulate injector has the apparatus mounted in the water cooled side wall panel 23 typically located at least 24 inches above the step 24 and about 15-24 inches away from the hot face 12 of the refractory 21 (depending upon the width of the refractory) so that the burner/lance flame and oxidizing gas flow or the particulate flow clears the step 24. A typical furnace 15 is shown on FIG. 1, where the My melted steel line comes to about 18 inches down from the sill line or step 24. The slag line is typically about 8 inches up from the steel line without foaming. With a conventional configuration, the burner/lance and particulate injector must wait until the steel line advances from the bottom of the furnace, or from the hot heel level 29, to almost fully melted during one or several melting stages. Unless the slag and steel lines can be penetrated by the supersonic jet core, the oxidizing gas lancing will not be effective and will only contribute to over oxidation of the iron carbon melt and free oxygen in the furnace atmosphere, both being detrimental to the operation of an efficient steel making process. In addition, because there is scrap in the way of the oxidizing gas lancing and particulate injection, it must be cleared before such operations can occur.

The configuration for the burner/lance 10, particulate injector 13 and enclosure 14 in FIGS. 1-5 illustrate that effective lancing with the oxidizing gas and particulate addition can be made much earlier in the melting cycle. The discharge ends of the burner/lance 10 and particulate injector 13 have been advanced to the edge of the hot face 12 of the refractory by protecting the apparatus with the enclosure 14. This moves the face or discharge ends of the burner/lance 10 and particulate injector 13 down (toward the melt) by the distance that the side wall burner has to be elevated to fire over the step and in (toward the center of the furnace) by the width of the step. This produces several advantages in operation over the conventional configuration. For the burner function, there is a much shorter distance to clear a path through the scrap to the surface of the melt so that this task can occur faster. In addition, the burner flame with this positioning can not flash back into the water cooled panel 23 and, if some flash back occurs, it will be absorbed by the refractory 21 which will not fail under such operation. Therefore, the burner function of the burner/lance 10 may be turned to its maximum rating much earlier than a conventional burner/lance. The thermal energy from the burner/lance is used more efficiently than before because, instead of bouncing off the outside of the scrap burden 13, the hot gases permeate through it thereby transferring more energy to the scrap.

With respect to the lancing function of the burner/lance 10, the distance that the flow of oxidizing gas must travel from the discharge end of the apparatus to the slag and melt surface has also been reduced by an amount proportional to the distance it was moved down and closer to the center. This alone produces a significant increase in decarburization efficiency. In FIG. 1, once a path has been cleared, it is shown that this allows the oxidizing gas to reach a semi-molten steel level with effective lancing power much earlier in the melting cycle than a conventional configuration, even with the same burner/lance. This permits effective decarburization to begin earlier in the melting cycle so that it may be completed earlier and reduce overall process time. Further, after the start of effective lancing the scrap continues to melt and the steel line rises to the fully melted stage. From the semi-melted stage to the fully melted stage and thereafter, the lancing effectiveness is greater for the burner/lance 10. The supersonic jet core penetrates deeper into the iron carbon melt because of the reduced path distance to the melt provided by this configuration.

While the preferred configuration of the burner/lance 10 and particulate injector 13 mounts their discharge ends as close to the hot face 12 of the refractory 21 and sill line 24 as possible to maximize the advantages of the invention, it is evident that any movement of the discharge ends in those directions would be beneficial. The advantages accrue non-linearly with the most increase in effectiveness occurring nearer to the sill line and hot face of the refractory, but there is still a measurable benefit from as small as a 20% movement either toward the sill line or toward the hot face of the refractory. In other words, the benefits of the invention are obtained from the sill line to 80% of the vertical distance between the sill line and a conventional mounting on the side wall and from the hot face to 80% of the horizontal distance between the hot face and a conventional mounting on the side wall.

Figure 7:
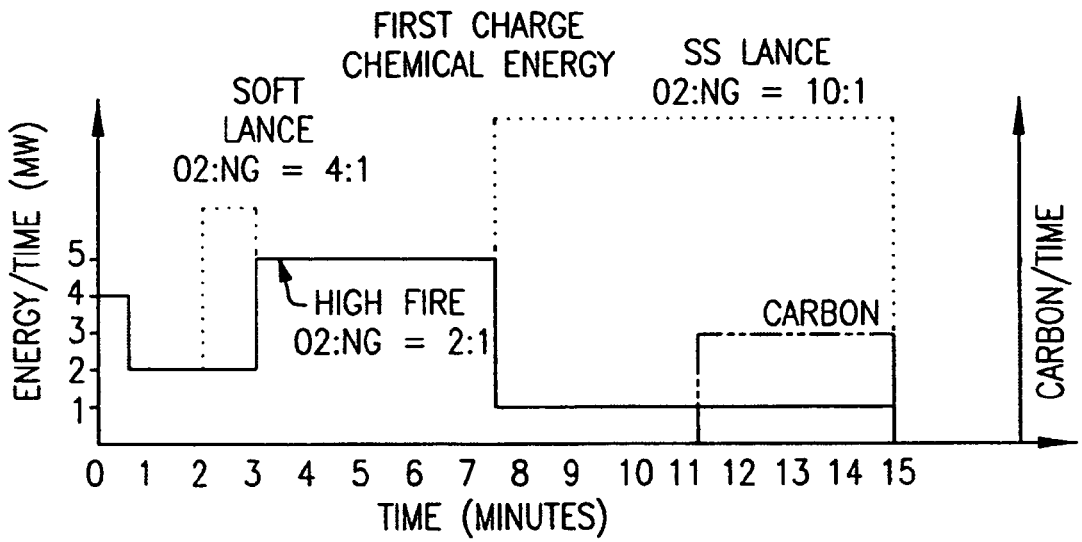
FIG. 7 is a graphical representation of the chemical energy as a function of time input by injection apparatus during the first charge of the melting phase for the steel making process of the improved configuration illustrated in FIGS. 1-5.
Figure 8:
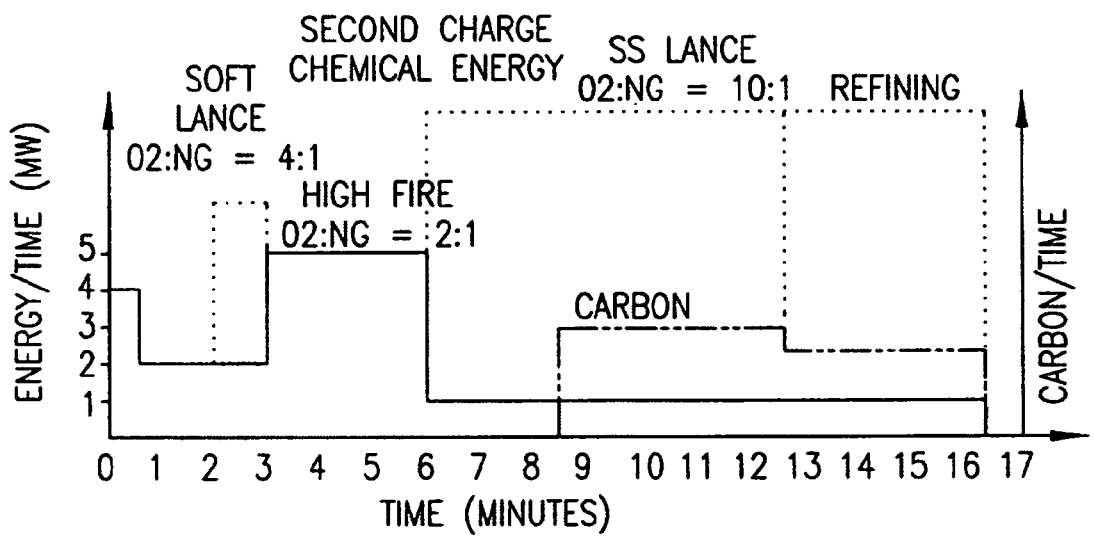
FIG. 8 is a graphical representation of the chemical energy as a function of time input by injection apparatus during the second charge of the melting phase and refining phase for the steel making process of the improved configuration illustrated in FIGS. 1-5.

To illustrate the manner in which the invention improves a steel making process, a melting phase, decarburizing and refining phase for steel making will now be described with reference to FIGS. 7-9. In FIG. 7 multiple modes are scheduled for the burner/lance 10 of the electric arc furnace 15 during at least one portion of the melting process of the furnace, in the example, the first of several scrap buckets (first charge). This portion of the melting process is scheduled for approximately 15 min. The burner/lance 10 used in the illustration is rated for a maximum output of 5.0 MW. Initially, the burner/lance 10 is operated in a burner mode at a firing rate of 4.0 MW to make sure it is not clogged during the loading of the scrap. As soon as the electric arc is turned on for the furnace 15, signaling that the roof is closed and scrap loading is completed, the burner is turned down to 2.0 MW for the first 3 minutes of the this portion of the melting cycle. This is to allow the burner/lance 10 to make a pocket in the scrap so that the flame may spread out. During this time for some part of the interval, for example at the start of minute 2 and for approximately 45-60 seconds, the oxygen/fuel ratio of the burner is turned up from the stoichiometric ratio (2:1) to a higher ratio of (4:1). This operation, sometimes termed soft lancing because the burner/lance 10 uses subsonic oxygen, allows the scrap to be burned by the excess oxygen so that a pocket can be established more readily, clearing the face of the burner/lance 10. Because this soft lancing is directed to impinge on the scrap still remaining in front of the burner and does not reach the reaction zone, it does not effect any decarburization of the melt. After about 3 minutes of operation, the pocket is basically formed and the burner/lance 10 may then be turned up to its maximum rating of 5 MW where it is operated from minutes 3-7.5 because it must to preheat the scrap and also clear a path between the front of the burner/lance 10 to the iron carbon melt which is forming in the furnace 15. After the burner/lance 10 has been on its maximum rating for enough time to assist in melting the scrap, it begins a supersonic oxygen lancing mode for the last minutes of the melting cycle where effective oxygen can be delivered to the iron carbon melt in a reaction zone.

Because of the mounting location of the burner/lance 10, the flame does not need to melt as long a path through to the iron carbon melt and can do so quickly as compared to a side wall mounted burner/lance. Because of its position of firing below the step in the refractory, the burner/lance 10 may be turned on to its maximum rating sooner in the melting cycle of the furnace 15 without concerns of a flashback. Further, the burner/lance 10 melts the scrap faster because the flame is already located in a spot which is relatively hot from the application of the electric arc. In addition, the hot combustion gases rise through the rest of the unmelted scrap to transfer their heat content to it.

Supersonic oxygen is started very early in the melting cycle at minute 7.5 and continues to the completion of the cycle. The oxygen injection according to the invention can be started at this part of the melting cycle because of the decreased time of the flame in preparing the path for the injection. Because the iron carbon melt is closer to the burner/lance 10, not as much scrap has to be melted before an effective oxygen flow can be introduced. Particulate carbon is started very early in the melting cycle at minute 11.5 and continues to the completion of the cycle. Because a path has been cleared to the slag accumulating in the furnace hearth, the establishment of a foamy slag for the protection of the furnace components from arc radiation can be initiated early in the first or subsequent melting cycles. While the flow of particulate carbon could be initiated even earlier (as soon as a path has been cleared at minute 7.5 and prior to or with the oxygen lancing), it is preferred that the oxidation reaction zones be established for several minutes before particulate carbon is added.

If a second bucket of scrap metal is to be melted, the process identically shown in FIG. 7 is repeated until all intermediate scrap buckets have been melted. On the last bucket of scrap to be melted, the supersonic oxygen is continued throughout a refining phase until the amount of carbon in the iron carbon melt has been reduced to the desired level. Similarly to the particulate injection for the first and intermediate melting stages. The carbon flow are initiated after the oxidation reaction zones are established at minute 8.5 and continue through the final melting stage to minute 13. When the refining stage begins, a vigorous foamy slag has been established and the particulate carbon flow may be reduced to maintain the foamy slag during the refining phase minutes 13-17.

This process is preferably carried out for two or more burner/lances 10 and/or two or more particulate injectors 13, each having an independent reaction zone but which can be controlled together as a system by controller 40. As will be more fully discussed hereinafter, once the carbon content of the iron carbon melt falls below the critical content amount, approximately 0.15%-0.20% carbon, then the total supersonic oxygen flow for the combined area of the reaction zones is reduced by an amount related to the carbon content.

Figure 9:
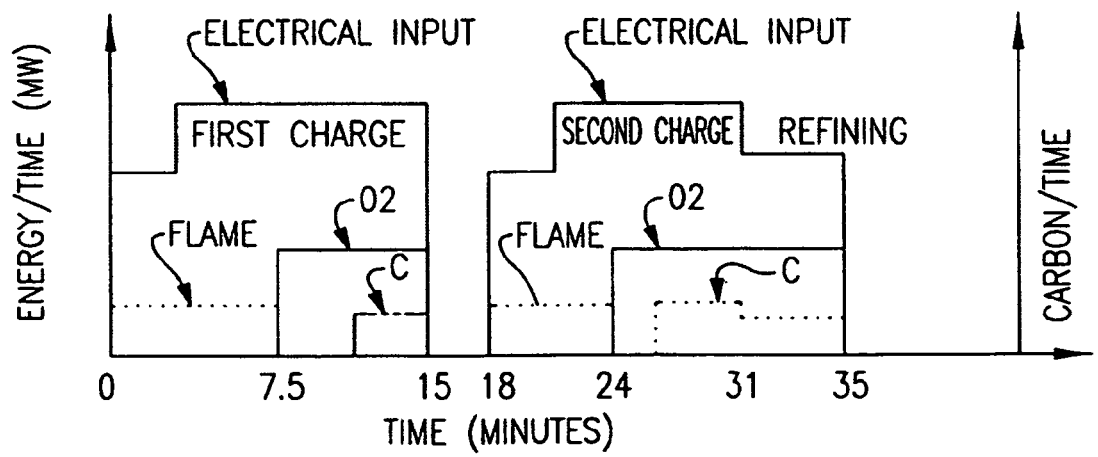
FIG. 9 is a graphical representation of the total input of electrical energy and chemical energy to an electric arc furnace as a function time for a steel making process according to one aspect of the present invention.

In FIG. 9, the electrical energy input, chemical energy, lancing of oxidizing gas and particulate carbon injection for a two charge melting, decarburizing and refining process used in steel making is shown. During the first portion of the melting cycle, the electric arc supplies electrical energy to the scrap and is aided in the melting process by the chemical energy from the combustion products of one or more burner/lances 10. The first bucket of the melting phase is split into a time when the burner/lance 10 supplies a flame and a time when it lances with an oxidizing gas. Similarly, a second bucket of scrap is melted by the electric arc and with the assistance of the combustion products of one or more burner/lances 10. After the melting cycle, the electric arc power is reduced and a refining and/or decarburization phase is entered. The second bucket of the melting phase is split into a time when the burner/lance 10 supplies a flame and a time when it supplies lancing with an oxidizing gas. The initiation of the lancing is limited to after a path to the iron carbon melt has been cleared and the iron carbon melt is sufficiently established such that effective lancing can take place. Once the second bucket of scrap is melted, the refining decarburization phase is entered. The lancing of oxidizing gas remains active until the desired carbon content for the product being made is reached. The lancing of the oxidizing gas is essentially a time dependent operation where a sufficient amount of oxygen must be input to chemically oxidize the amount of carbon to be removed from the iron carbon melt.

FIG. 9 illustrates one embodiment of the present invention where for the same furnace and scrap burden, the lancing of the oxidizing gas particulate carbon injection can be initiated sooner in each of the two melting phases. While the conventional or side wall mounted burner/lance was able to start the oxidizing gas lancing at about 80% of the time through the each bucket of the melting phase, the present invention can begin lancing the oxidizing gas much sooner, at approximately 50% of the time through the each melting phase.

In a preferred embodiment in FIG. 5, for the purpose of decarburization, four separate oxygen reaction zones have been established. The number of the multiple zones and their placement are usually suggested by the particular operation of the furnace and its configuration. Generally, increasing the number of reactions zones increases the total area over which the decarburization reaction takes place and is desirable for both phases of decarburization. Increasing the number of reaction zones makes the first phase of the decarburization process more efficient by increasing the amount of oxidizing gas which can be supplied while there is an excess demand for oxygen. This reduces the time necessary to reach the critical carbon content of the melt and begin the second phase. Increasing the number of the reaction zones particularly increases the efficiency of the second phase of decarburization where the process is dependent upon the surface kinetics of the process, particularly the mass transfer rate of the carbon. In typical furnaces of either the AC type furnace or the DC type furnace, the number of reaction zones would be a number from 2-8 independent reaction zones.

Normally the steel making process is characterized by a decarburization process in which the amount of carbon in the bath is steadily reduced by blowing oxygen into an iron carbon melt. The rate at which this can be done is the decarburization rate (−dC/dt) which is measured in points/mm, where a point is 0.01%. The decarburization rate is generally flat until the critical carbon content, approximately 0.15%-0.20% of carbon, is reached and then decreases relatively quickly as the carbon content and reaction kinetics become rate limiting.

The preferred method for controlling the oxygen profile supplied during a decarburization process will now be disclosed. The flow controller 40 includes a program which controls the total amount of oxygen supplied from the four burner/lances 10 during the lancing operation. The preferred oxygen profile which the controller applies is based upon the amount of carbon content of the iron carbon melt. The oxygen profile is generally split into two sections having: the first section supplying a predetermined amount of oxygen per unit time based upon the rate at which the decarburization is to take place, the amount of carbon to be removed and the time allowed for removing it, generally at about the rate of 3-6 points per minute until the critical carbon content is reached; and the second section in which the total oxygen supplied is reduced proportionally to the reduced carbon content to minimize any over oxidation of the iron carbon melt and free oxygen in the furnace atmosphere.

Several methods for the oxygen profiling for the second section may be used by the controller 40. The controller 40 can reduce the total oxygen supplied to the multiple reaction zones after the critical carbon content is reached by (a) turning off one or more of the burner/lances; (b) varying the duty cycle of one or more of the burner/lances; (c) a combination of turning off or varying the duty cycle of one or more of the burner/lances; (d) varying the flow rate of one or more of the burner/lances; or (e) by a combination of turning off; varying the flow rate or varying the duty cycle of one or more of the burner/lances.

Figure 10:
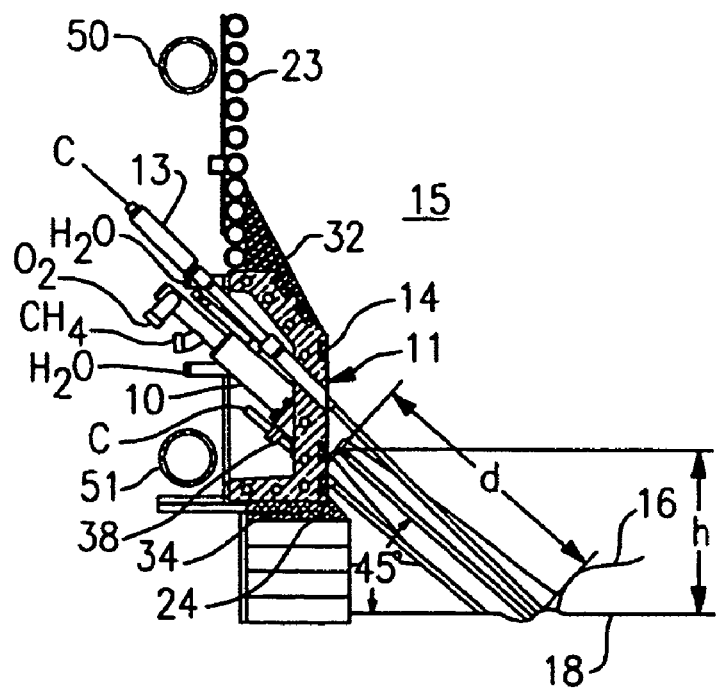
FIG. 10 is a cross-sectioned side view of a second embodiment of injection apparatus which shows the burner/lance and the two particulate injectors of the apparatus.
Figure 11:
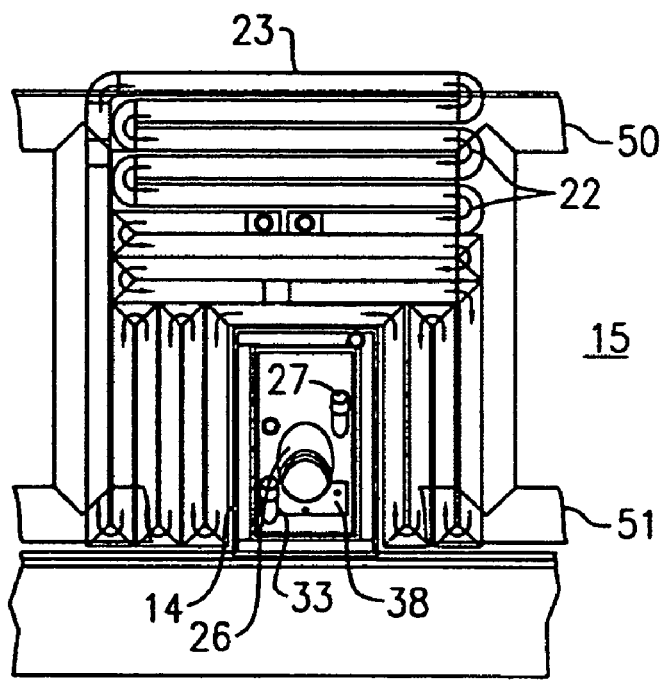
FIG. 11 is a rear view of the injection apparatus illustrated in FIG. 10 which shows the mounting enclosure without the burner/lance and particulate injectors of the apparatus.
Figure 12:
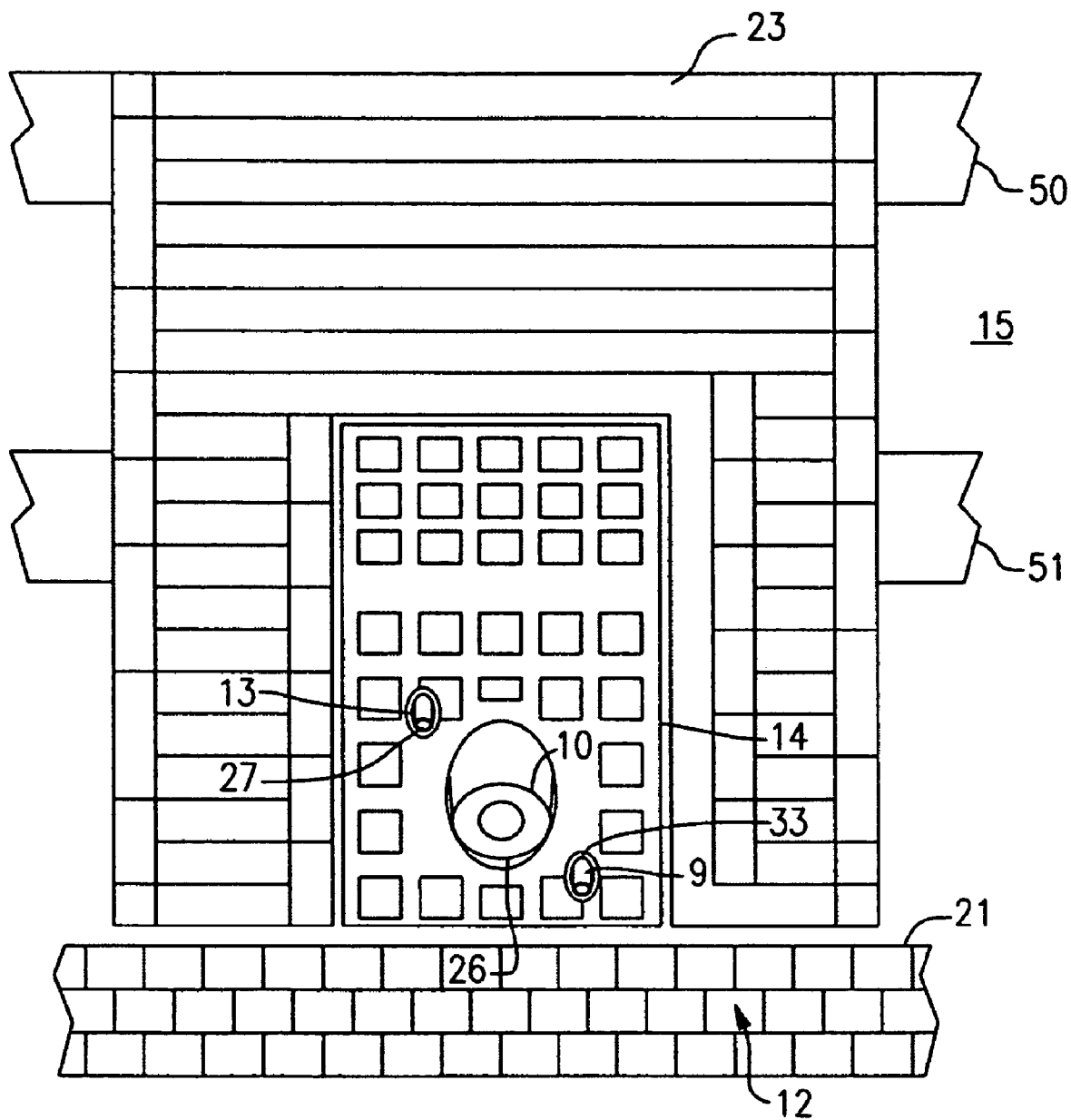
FIG. 12 is a front view of the injection apparatus illustrated in FIG. 10.

FIGS. 10-12 illustrate a second preferred embodiment of the injection apparatus 11. The injection apparatus 11 is similar to the first embodiment in that it comprises a burner/lance 10, a particulate injector 13 and a mounting enclosure 14. These elements are constructed and operate in the same manner as described for the similarly numbered elements of the previous embodiment. In this embodiment, a second particulate injector 9, similar in construction and operation to injector 13, has been mounted in the enclosure 14. The mounting position of the discharge end of the particulate injector 9 is below and to the left (as looking into the furnace 15 in FIG. 13) of the discharge end of the burner/lance 10. The mounting angle of the particulate injector 9 is preferably approximately 45 degrees, similar to the mounting angle of the particulate injector 13 and burner/lance 10. The flows for both particulate injectors 9, 13 are substantially parallel to the flow of oxidizing gas for the burner/lance 10.

Figure 13:
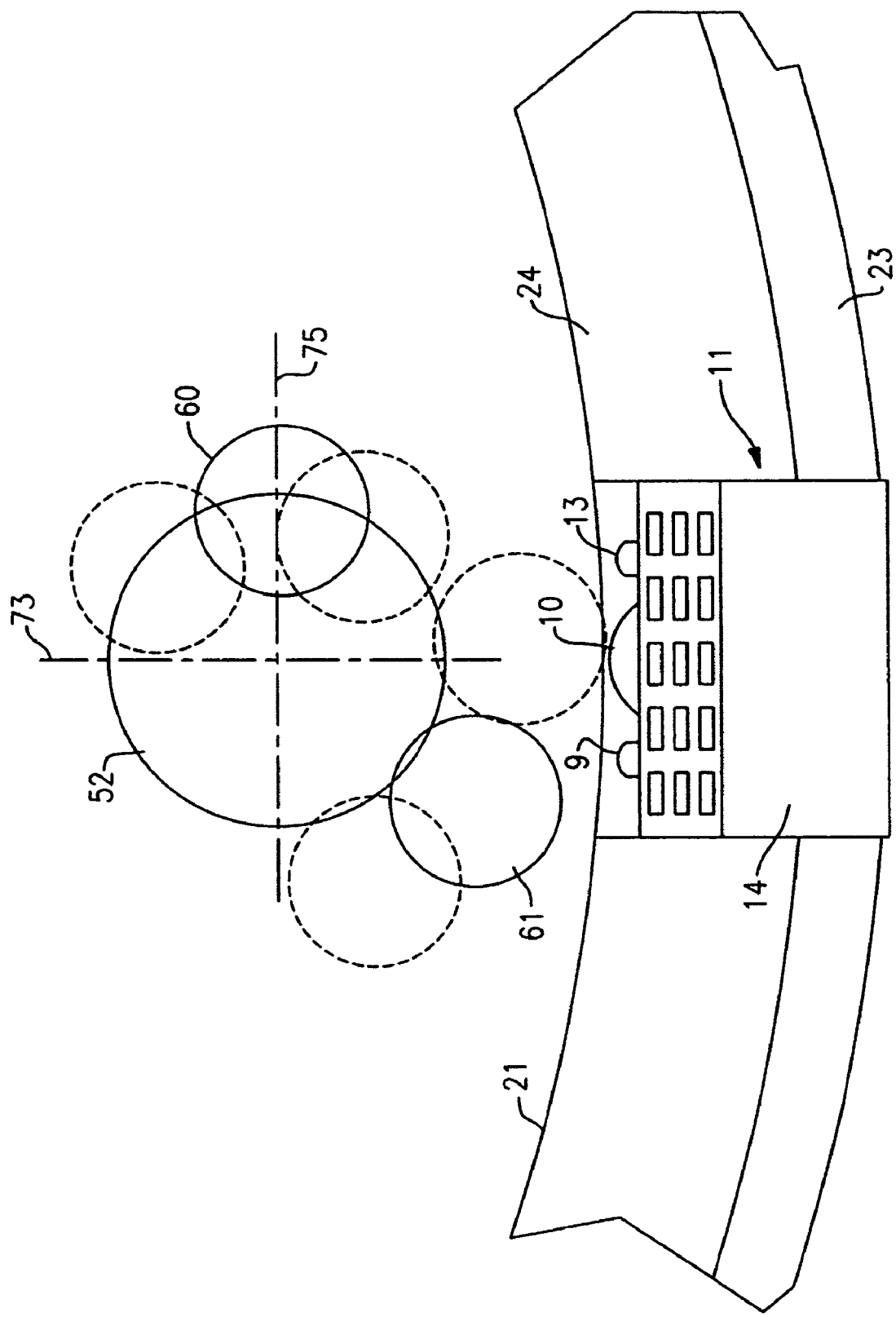
FIG. 13 is a partially cross-sectioned plan view of the injection apparatus illustrated in FIGS. 10-12 mounted on an electric arc furnace pictorially representing the oxidation reaction zone and particulate reaction zones.

With reference now to FIG. 13, the positioning of the second particulate injector 9 produces a flow of particulates, preferably carbon particles entrained in a carrier gas, that penetrate the slag at a second particulate reaction zone 61. The second particulate reaction zone 61 is along the periphery of the oxidation reaction zone 52 on its upstream side so that the normal counterclockwise furnace circulation brings slag with FeO into the zone. The second particulate reaction zone 61 is positioned to efficaciously introduce carbon particles between the oxidation reaction zone 52 and the refractory of the furnace above the metal line. The endothermic reaction of the carbon with the slag produces a cooling effect for the refractory and importantly prevents a substantial portion of the hot FeO that is being generated in the oxidation reaction zone 52 from reaching the refractory around the mounting enclosure 14. This effect combines with the cooling effect produced by the circulation of fluid through the mounting enclosure in contact with the refractory to prevent erosion of the refractory at the slag/metal interface level.

While the second embodiment illustrates a particular distribution for the particulate injectors 9 and 13, it is evident that many other different distributions can be envisioned within the scope of the invention. One or more particulate injectors may be mounted in the enclosure 14 at various places to produce a flow of particulate materials establishing one or more particulate reaction zones on the periphery of the oxidation reaction zone. Those particulate reaction zones established on the downstream side of the oxidation reaction zone 52 (to the right of centerline 73) reduce a part of the FeO from the oxidation reaction zone and cool the slag. Those particulate reaction zones established between the oxidation reaction zone 52 and the refractory 21 (below centerline 75) reduce a part of the FeO from the oxidation reaction zone 52 and cool the slag before it reaches the refractory. When multiple oxidation reaction zones are used in a system, each oxidation reaction zone may have none, one or more than one associated particulate reaction zone located on its periphery.

The first and second embodiments of the injection apparatus can also be operated in an improved method for recarburizing an iron carbon melt. Returning to FIG. 5, the multiple injection apparatus 11 which efficiently supply combustion gases and high velocity carbon particulates to the respective reaction zones are used in a process to add carbon content to the iron carbon melt. The flows of combustion gases are applied at the same time or substantially the same time as the flows of carbon particulates to increase the carbon level of the melt.

The separate reactions zones allow the combustion gases to heat the slag to reduce its viscosity without burning the carbon. The carbon is injected into the thinner slag and can more efficiently penetrate through to the iron carbon melt. The shorter injection distance to the melt provided by the mounting enclosure permits the carbon particles to impinge on the melt with greater velocity so that they can be incorporated easily therein. The multiple carbon injection points allow relatively large amounts of carbon to be added to the iron carbon melt quickly and with a uniform distribution. This shortens the duration of the recarburization process and allows the bath to come to equilibrium in an optimal amount of time.

While the invention has been described in connection with the preferred embodiments, this specification is not intended to limit the scope of the invention to the particular forms or methods set forth, but, to the contrary, it is intended to cover any such alternatives, modifications, and equivalents as may be included within the spirit and scope of the invention as defined by the appended claims.

The invention claimed is:

1. A method for providing a mounting enclosure within an electric arc furnace having a side wall, a hearth, and a refractory step extending substantially horizontally between the side wall and the edge of the hearth, the method comprising:
    inserting the mounting enclosure within the furnace;
    placing the mounting enclosure on the refractory step such that the mounting enclosure extends from the side wall to the edge of the hearth; and
    aligning an aperture in the mounting enclosure with an aperture in the side wall.

2. The method of claim 1, further comprising inserting a refractory ramming material to close gaps between the bottom of the mounting enclosure and the refractory step and between the back of the mounting enclosure and the side wall to create thermal contact between the mounting enclosure the refractory step and the side wall.

3. The method of claim 1, further comprising establishing fluid communication between the mounting enclosure and a cooling fluid source outside of the furnace.

4. The method of claim 1, connecting cooling tubes in the mounting enclosure to a cooling fluid source outside of the furnace.

5. The method of claim 1, further comprising placing one or more of a burner, lance, and particle injector in the mounting enclosure;
    wherein the one or more of a burner, lance, and particulate injector is disposed at approximately a 45 degree angle from vertical.

6. The method of claim 1, further comprising positioning the back of the mounting enclosure against the side wall and the front of the mounting enclosure at the edge of the refractory step proximate the hearth.

7. The method of claim 1, further comprising positioning the aperture in the mounting enclosure above the edge of the refractory step.

8. The method of claim 1, wherein inserting the mounting enclosure within the furnace further comprises inserting the mounting enclosure within the interior perimeter of the furnace defined by the side wall.

9. A method for heating a material in an electric arc furnace having a side wall, a hearth, and a refractory step extending substantially horizontally between the side wall and the edge of the hearth, the method comprising:
    inserting a burner from outside of the furnace through an aperture in the side wall;
    passing the burner through an aperture in a mounting enclosure disposed within the interior of the furnace defined by the side wall;
    guiding a discharge end of the burner through the mounting enclosure from the side wall at an angle between approximately 30 and 60 degrees to a position approximately above the edge of the hearth within the mounting enclosure; and
    activating the burner to heat a material disposed in the hearth.

10. The method of claim 9, further comprising cooling the mounting enclosure with a cooling fluid.

11. The method of claim 9, further comprising:
    inserting an injector from outside of the furnace through an aperture in the side wall;
    passing the injector through an aperture in a mounting enclosure disposed within the interior of the furnace defined by the side wall;
    guiding a discharge end of the injector through the mounting enclosure from the side wall at an angle between approximately 30 and 60 degrees to a position above the edge of the refractory step within the mounting enclosure; and
    activating the injector to inject a substance into the inside of the furnace.

12. The method of claim 9, further comprising placing the mounting enclosure atop the refractory step such that the mounting enclosure extends from the side wall to the edge of the refractory step.

13. The method of claim 9, further comprising:
    cooling the side wall by injecting a cooling fluid into cooling tubes within the side wall through a first cooling inlet; and
    cooling the mounting enclosure by injecting a cooling fluid into cooling tubes within the mounting enclosure through a second cooling inlet.

14. The method of claim 9, wherein the flame envelope generated by the burner does not come in contact with the refractory step.

* * * * *